(12) United States Patent
Clarke

(10) Patent No.: US 11,719,536 B2
(45) Date of Patent: Aug. 8, 2023

(54) APPARATUS, SYSTEM, AND METHOD FOR AERIAL SURVEYING

(71) Applicant: Gerald Stewart Clarke, Bracebridge (CA)

(72) Inventor: Gerald Stewart Clarke, Bracebridge (CA)

(*) Notice: Subject to any disclaimer, the term of this patent is extended or adjusted under 35 U.S.C. 154(b) by 470 days.

(21) Appl. No.: 17/029,849

(22) Filed: Sep. 23, 2020

(65) Prior Publication Data

US 2021/0088332 A1 Mar. 25, 2021

Related U.S. Application Data

(60) Provisional application No. 62/904,944, filed on Sep. 24, 2019.

(51) Int. Cl.
*G01C 15/00* (2006.01)
*G05D 1/00* (2006.01)
*G05D 1/10* (2006.01)

(52) U.S. Cl.
CPC ......... *G01C 15/002* (2013.01); *G05D 1/0094* (2013.01); *G05D 1/101* (2013.01)

(58) Field of Classification Search
CPC .................................................. G01C 15/002
USPC ..................................................... 33/290–296
See application file for complete search history.

(56) References Cited

U.S. PATENT DOCUMENTS

| | | | | |
|---|---|---|---|---|
| 6,621,560 B2* | 9/2003 | Greco | ................. | G01B 21/045 |
| | | | | 33/366.11 |
| 8,422,034 B2* | 4/2013 | Steffensen | ............ | G06F 3/0304 |
| | | | | 356/614 |
| 9,121,689 B2* | 9/2015 | Bridges | ................... | G01S 17/66 |
| 9,377,301 B2* | 6/2016 | Neier | ....................... | G01S 17/87 |
| 9,389,073 B2* | 7/2016 | Dumoulin | ........... | G02B 27/648 |
| 9,594,167 B2* | 3/2017 | Zogg | .................... | G01C 15/002 |
| 9,733,082 B2* | 8/2017 | Kumagai | ............ | G01C 15/002 |
| 2018/0081056 A1* | 3/2018 | Ohtomo | ............... | G01C 15/002 |
| 2018/0350086 A1* | 12/2018 | Sweet, III | .............. | G01C 21/00 |
| 2019/0339075 A1* | 11/2019 | Ohtomo | ............... | G01C 15/004 |
| 2021/0088332 A1* | 3/2021 | Clarke | ................. | G05D 1/0094 |
| 2022/0026208 A1* | 1/2022 | Ito | ......................... | B64D 47/08 |
| 2022/0099442 A1* | 3/2022 | Eno | ........................ | B64D 43/00 |
| 2022/0153413 A1* | 5/2022 | Riccardo | ................ | G05D 1/101 |
| 2022/0308183 A1* | 9/2022 | Matsumoto | ............. | G01S 17/14 |
| 2023/0047975 A1* | 2/2023 | Wohlfeld | .............. | G01S 17/894 |

* cited by examiner

*Primary Examiner* — George B Bennett
(74) *Attorney, Agent, or Firm* — Merek, Blackmon & Voorhees, LLC

(57) ABSTRACT

There is provided an apparatus, a system, and a method for locating and marking a position on a surface during surveying. The apparatus is for use with a rotorcraft or flying machine and a positioning device, and comprises a gimbal securable to the rotorcraft or flying machine, a prism fixed to the gimbal for reflecting signals from the positioning device, the prism having a center of mass, a laser secured to the gimbal and directed away from the center of mass of the prism towards the surface, and a controller for communication with the positioning device, the controller operatively coupled to the laser to operate the laser.

20 Claims, 7 Drawing Sheets

APPARATUS, SYSTEM, AND METHOD FOR AERIAL SURVEYING

FIELD

This invention relates generally to systems and methods for surveying and mapping. More specifically, the invention relates to systems and methods for use with equipment for projecting and communicating coordinates.

BACKGROUND

Surveying devices exist for surveying land areas and structures. Known devices and methods, often require labour intensive location, movement and relocation of a prism pole or other equipment in order to accurately mark or determine a coordinate location.

Some survey devices are configured to selectively connect to surveying equipment, such as a surveying pole, to allow for a reference point to be adjusted in at least two axes. Such a device is often adapted to work in conjunction with additional surveying equipment, including theodolites and transits, as well as one or more central processing units for analyzing, storing, and providing data. However, these devices only allow for re-adjustment of a reference point in two axes. Moreover, the re-adjustment is typically limited by the size of the pole and the positioning device. A user would have to move a pole in various directions until coordinates are determined at an acceptable tolerance. This is difficult to do if the terrain to be measured or surveyed is uneven, soft and/or difficult to enter. In such environments, not only might it be difficult for survey crews to access the surface, it may also be difficult for the crew to maintain a prism pole in a vertical orientation. If the prism and point are not aligned, significant variations in measurement can occur.

SUMMARY

In one aspect of the invention there is provided an apparatus for use with a rotorcraft or flying machine and a positioning device, the apparatus for locating and marking a position on a surface, the apparatus comprising: a gimbal securable to the rotorcraft or flying machine; a prism fixed to the gimbal for reflecting signals from the positioning device, the prism having a center of mass; a laser secured to the gimbal and directed away from the center of mass of the prism towards the surface; and a controller for communication with the positioning device, the controller operatively coupled to the laser to operate the laser.

In another aspect of the invention there is provided an aerial device for use with a positioning device for locating and marking a position on a surface, the aerial device comprising a rotorcraft or flying device with main rotary wings and a processor operatively coupled to control the main rotary wings; and the apparatus described above secured to the rotorcraft.

In a further aspect of the invention there is provided a system for locating and marking a position on a surface, the system comprising the aerial device described above; and a stationary positioning device adapted to send and receive signals from the aerial device, the positioning device comprising a processor configured to calculate the coordinates of the aerial device from the received signals.

In a yet further aspect of the invention, there is provided a method for locating and marking a specified position on a surface using a stationary positioning device and an aerial device, the aerial device having a rotorcraft, a gimbal secured to the rotorcraft, a prism fixed to the gimbal, a laser secured to the gimbal, and a controller operatively coupled to the laser, the method comprising: directing the aerial device to be located above the surface; determining a distance and an angle between the aerial device and the positioning device; positioning the aerial device over the specified position based on the distance; and projecting a first laser beam onto the specified position on the surface when the aerial device is positioned over the specified position.

In yet further aspects of the invention, a system is provided that maintains vertical alignment of a location system from an aerial device.

In still further aspects of the invention, a system is provided for locating an aerial vehicle in a measurement location and using high resolution photography to confirm measurement location in combination with total station infrared precision measurements.

In yet further aspects of the invention, a system is provided for positioning a precision measurement system with an illumination source.

The invention also provides apparatus for creating an accurately located image of a location, the apparatus comprising an aerial device capable of locating above the desired location; an illumination system capable of indicating where the aerial device is located; controls for adjusting the position of the aerial device to more precisely position where the illumination system aligns with a feature of the environment; and a system for performing a precision measurement of the location of the aerial device when aligned with the feature of the environment.

The invention further provides method of measuring the position of a feature in an environment, the method comprising an illumination system capable of illuminating a physical feature in the environment; an aerial device capable of sensing the illumination, the aerial device also capable of locating above the desired location; and a system for performing a precision measurement of the location of the aerial device when aligned with the feature of the environment.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

Figure 1:
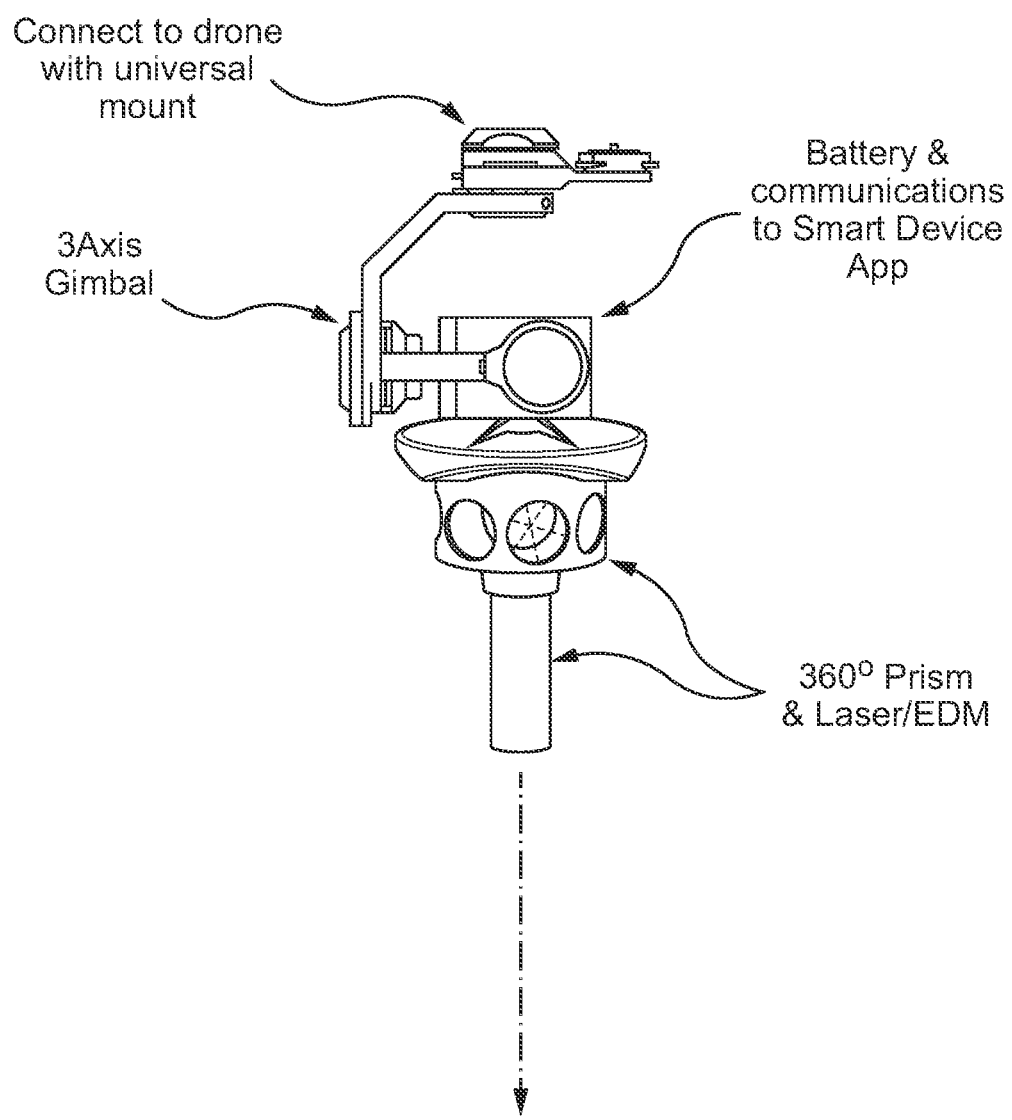
FIG. 1 is a front view of an apparatus according to an embodiment of the present invention.
Figure 2:
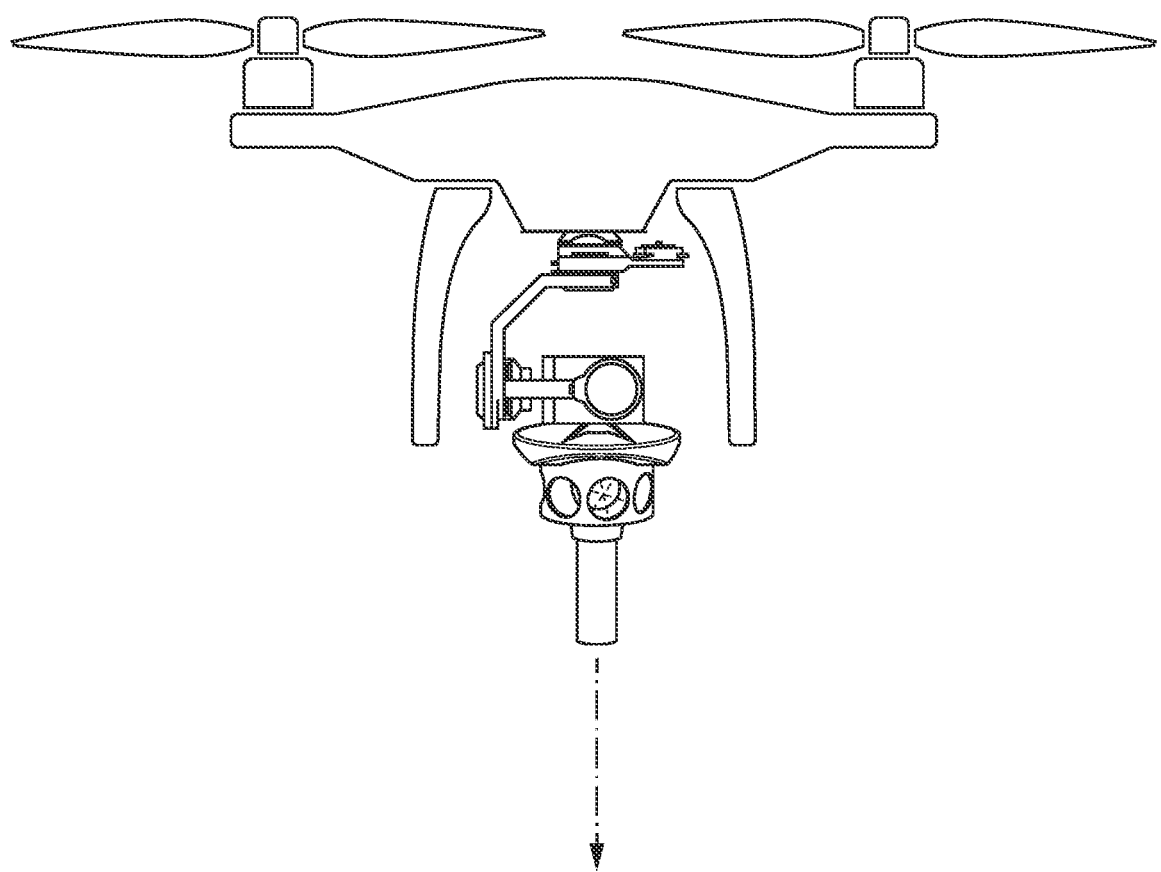
FIG. 2 is a front view of an aerial device according to an embodiment of the present invention incorporating the apparatus of FIG. 1.

The present invention may be embodied in a number of different forms. The specification and drawings that follow describe and disclose some of the specific forms of the invention.

As used herein, the term "vertical" shall be read to mean generally perpendicular with the plane of the horizon or generally parallel with the gravitational force of the earth. The term "horizontal" as used herein shall be read to mean generally parallel with the plane of the horizon or generally perpendicular to a vertical orientation.

The present disclosure relates to an apparatus 10 for use with a rotorcraft or other flying machine 102 and a positioning device 202 for locating and marking a position 302 on a surface 300. Generally, apparatus 10 includes a gimbal 12, a prism 14, a laser 16, and a controller 18.

Gimbal 12 is securable to rotorcraft 102. For example, in the depicted embodiment, gimbal 12 is secured to a universal mount 20. Universal mount 20 itself is adapted to be securable to an aerial device, such as rotorcraft 102. Gimbal 12 is further shown to be a 3-axis gimbal or a gyroscope, where the three axis are connected by arms 22. In this manner, the structures maintained by gimbal 12 may retain their orientation in space or their orientation can be adjusted accordingly.

One element maintained by gimbal 12 is prism 14. Prism 14 is fixed to gimbal 12 and is structured for reflecting signals from a positioning device 202. In the present embodiment, prism 14 is a 360 degree prism with a center of mass 24. In order to prevent possible damage to prism 14, apparatus 10 may include an enclosure 26 surrounding prism 14. Enclosure 26 may include apertures 28 positioned about prism 14 to allow signals from positioning device 202 to be reflected back to positioning device 202, regardless of the orientation of prism 14 relative to positioning device 202.

Another element maintained by gimbal 12 is laser 16. Laser 16 is secured to gimbal 12, facing away from center of mass 24 of prism 14 towards surface 300. In this manner, laser 16 project a generally vertical laser beam to locate and mark position 302 on surface 300. In some applications, laser 16 is adapted to project laser beams in multiple colours. For example, laser 16 may project a laser beam in red or green. In alternate applications, laser 16 may be adapted to project laser beams with one or more designs. For example, laser 16 may project a laser beam with a crosshair, a circle with a crosshair, or another design/image.

In the depicted embodiment, apparatus 10 includes an electronic distance measurement device (EDM) 30, where laser 16 forms part of EDM 30. In this manner, not only does laser 16 project a laser beam onto surface 300 to mark a position, the beam from laser 16 is also used to determine the distance between apparatus 10 and surface 300. As understood by the skilled person, such EDM devices can use phase changes or the amount of time required for electromagnetic energy waves to travel from apparatus 10 to surface 300 to determine the distance therebetween. Other forms of EDMs could be used.

Apparatus 10 further includes controller 18 for communication with positioning device 202, where laser 16 is operatively coupled to controller 18. Controller 18 may further include a power source, such as a battery, for powering controller 18 and laser 16.

As shown in the attached Figures, controller 18 may be secured between gimbal 12 and prism 14. Prism 14 may be, in turn, secured between controller 18 and laser 16. As understood by the skilled person, however, controller 18 may not be maintained by gimbal 12, i.e. be positioned downstream of gimbal 12. In an alternate embodiment, controller 18 may be secured to arm 22, universal mount 20, or another structure of apparatus 10, so long as controller 18 is configured to communicate with positioning device 202 and is operatively coupled to laser 16.

In some applications, apparatus 10 may further include an audio device 32 for projecting one or more sounds, the audio device being operatively coupled to controller 18. In the present embodiment, audio device 32 is positioned with controller 18. Similar to controller 18, however, audio device 32 may be positioned "upstream" of gimbal 12, i.e. secured to arm 22 or universal mount 20. Audio device 32 may alternately be secured to another structure of apparatus 10, so long as it is operatively coupled to controller 18.

The present disclosure also relates to an aerial device 100 for use with positioning device 202 for locating and marking position 302 on surface 300. Generally, aerial device 100 includes apparatus 10, as described above, and rotorcraft 102. Rotorcraft 102 comprises primary rotary wings 104 and a processor (not shown), to control rotary wings 104.

As noted above, apparatus 10 may be secured to rotorcraft 102 via universal mount 20. In the depicted embodiment, rotorcraft 102 is a drone with a pair of rotary wings 104. The generally horizontal positioning of rotary wings 104 allows aerial device 100 to take off and land vertically, hover, and fly forwards, backwards and side-to-side. An example of a drone that may be used in such an application is DJI Mavic 2 Pro™. While a drone with two main rotors is depicted, the skilled person would understand that a different type of unmanned aerial vehicle may be used as part of aerial device 100, so long as rotorcraft 102 is structured to be able to fly and hover over position 302 on surface 300. Alternately, rotorcraft 102 may be a helicopter with a single rotor, or a quad copter rotor with four rotors, such as the DJI Mavic 2 Pro™, which may provide enhanced stability compared to a two rotor system.

While not shown in the Figures, aerial device 100 may further include a wind sensor that is operatively coupled to the processor and vertical wings. The wind sensor may be a 360 degree sensor that is adapted to detect movement of wind proximate aerial device 100, including the direction and force of the wind. The presence of wind about aerial device 100 may shift or move aerial device 100 away from a desired position.

Vertical wings (not shown) may be mounted generally perpendicular to main rotary wings 104 and operatively coupled to the processor. Upon detection of a force of wind acting on aerial device 100, the processor may direct or actuate the vertical wings, along with main rotary wings 104, to compensate for roll, pitch and yaw of aerial device 100. The vertical wings may also be used for the initial translational movement of aerial device to position 302. Aerial device 100 may further include GPS stabilization features (not shown in the Figures) as known in the act.

The present disclosure furthers relates to a system 200 for locating and marking position 302 on surface 300. Generally, system 200 includes aerial device 100, as described above, and stationary positioning device 202. Positioning device 202 is adapted to send signals to, and receive signals from, aerial device 100. Positioning device 202 incudes a processor 204 that is configured to calculate the position or coordinates of aerial device 100 from the signals received from aerial device 100.

In the depicted embodiment, positioning device 202 is a total station 206 as typically used for surveying and building construction. In an alternate embodiment, positioning device 202 may be a smart device, such as a smart phone. In certain applications, positioning device 202 may be further configured to control and direct the movement of aerial device 100 over position 302. In still other applications, a remote control device (not shown) that is separate from positioning device 202 may be used to control and direct the movement of aerial device 100.

Figure 4:
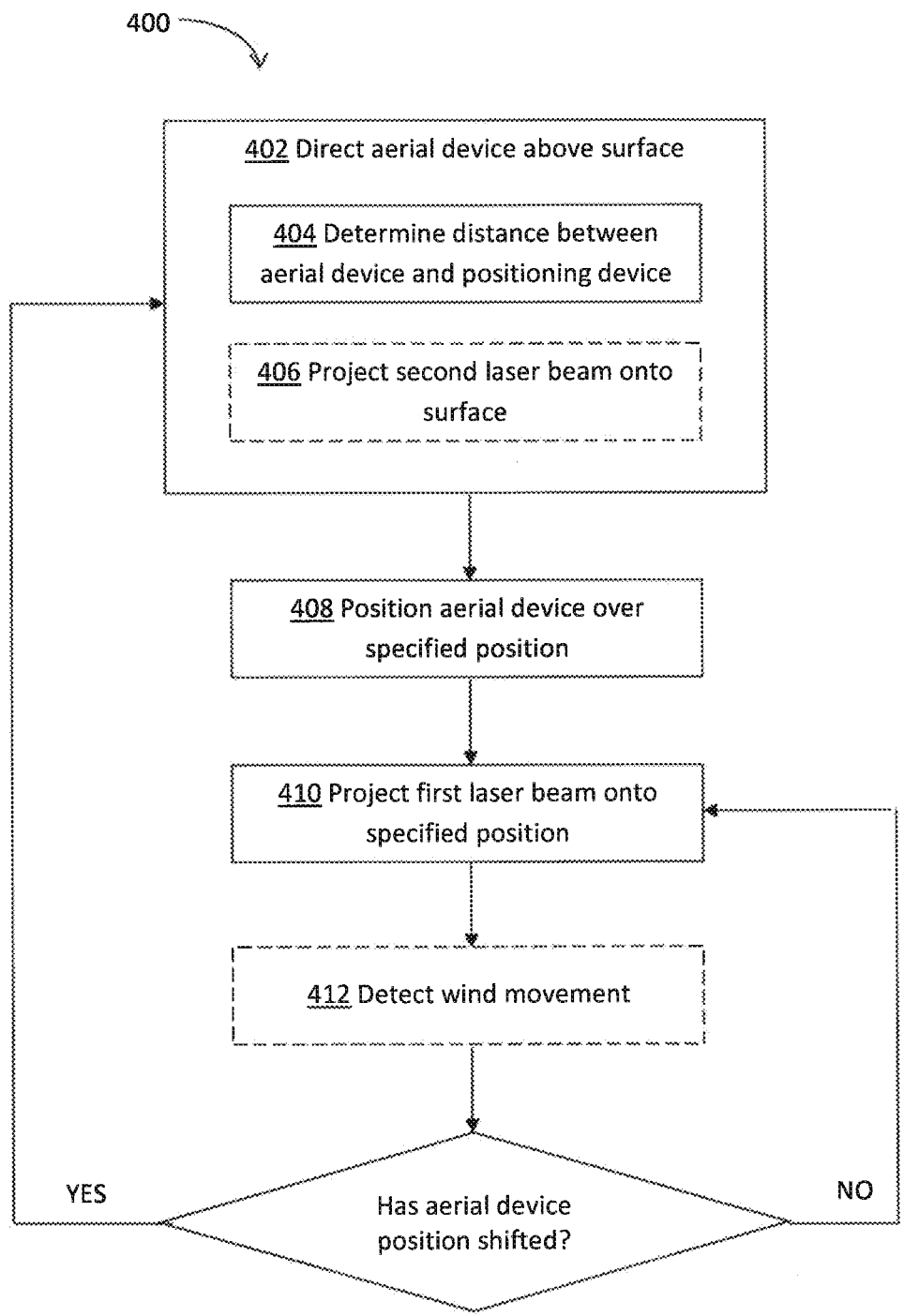
FIG. 4 is a flowchart illustrating an exemplary method by which the system of FIG. 3 may be used.

Turning to FIG. 4, there is illustrated a method 400 by which apparatus 10, aerial device 100, and system 200 may be used. An apparatus, an aerial device and a system different than that described above may also be used in method 400. Method 400 is performed for locating and marking a desired position 302 on surface 300 with stationary positioning device 202 and aerial device 100. For example, a user may wish to position aerial device 100 at coordinates X, Y, Z, relative to positioning device 202. This would allow specified position 302 at coordinates X, Y to be located and marked relative to positioning device 202.

Figure 3:
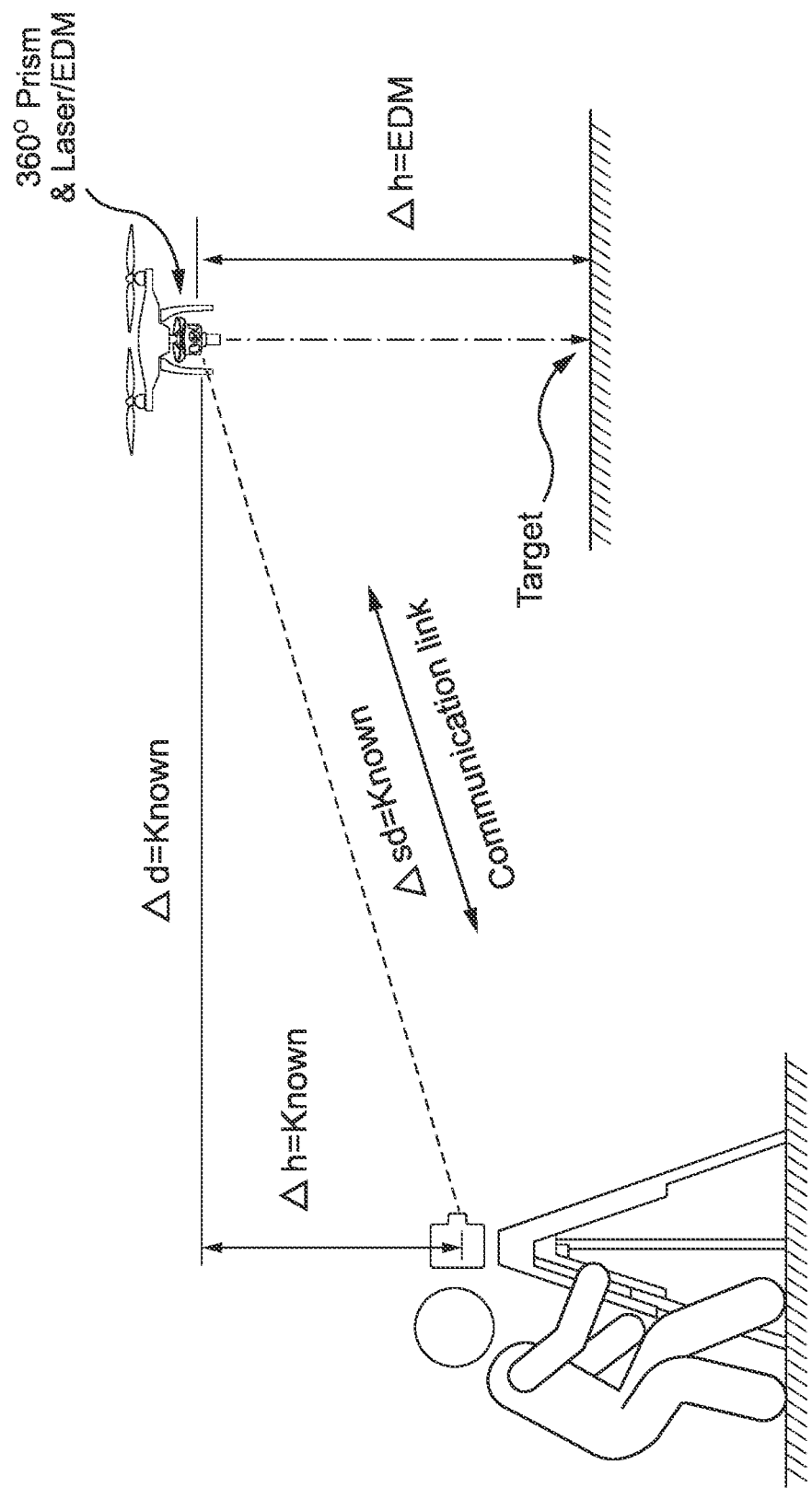
FIG. 3 is a side view of a system according to an embodiment of the present invention incorporating the aerial device of FIG. 2.

At 402, aerial device 100 is directed to fly over/above surface 300. The movement of aerial device 100 may be controlled by positioning device 202 or by a separate remote control. In order to determine whether aerial device 100 is approaching or at coordinates X, Y, Z, a distance (Δsd, see FIG. 3 for example) between aerial device 100 and positioning device 202 is determined.

In the embodiment depicted, this distance is determined via a communication link between total station 206 and aerial device 100. For example, total station 206 sends out a signal. This signal is received by prism 14 of aerial device 100 and reflected back towards total station 206. The distance and angle between total station 206 and prism 14 is then determined at 404.

Knowing the distance and the angle between total station 206 and prism 14 allows the real-time actual X, Y coordinates of aerial device 100, relative to total station 206, to be calculated and compared to the desired coordinates. Based on this compared data, aerial device 100 may be moved until aerial device 100 is positioned above specified position 302 at X, Y (408). With EDM device 30, laser 16 may also be used to determine the Z distance between aerial device 100 and specified position 302.

Once aerial device 100 is determined to be positioned above specified position 302, a first laser beam may be projected onto surface 300 at 410. This projection of the first laser beam visually marks specified position 302 for the user to see. The user may then physically mark specified position 302 or otherwise process the indicated position as required.

In some applications, laser 16 may not be activated by controller 18 until aerial device 100 is positioned above specified position 302. Alternately and optionally at 406, before aerial device 100 arrives at specified position 302, a second laser beam may be projected onto surface 300. The second laser beam may be a different colour than that of the first laser beam in order to indicate that aerial device 100 is not positioned at specified position 302. For example, the second laser beam may be red and the first laser beam may be green. In this manner, while aerial device 100 is travelling towards coordinates X, Y, Z, the laser point on surface 300 may be red. Upon arrival at specified position 302, the laser point may change to green to visually indicate to the user that aerial device 100 has arrived at the specified position.

In another example, the first laser beam may project a first design or image on surface 300 when aerial device 100 is positioned at specified position 302. In this example, the second laser beam may also project a second design on surface 300 when aerial device 100 is not positioned at specified position 302. For example, the first design may be crosshairs and the second design may be a circle, to visually indicate to the user whether aerial device 100 has arrived at the specified position.

In a further example, in addition to the visual laser beam indicator described above, method 400 may include emitting a first audio sound when aerial device 100 is positioned over specified position 302. Optionally, a second audio sound may be emitted when aerial device 100 is not positioned over specified position 302 to audibly indicate to the user whether aerial device 100 has arrived at coordinates X, Y, Z.

Often when working outdoors, the elements may affect the position of aerial device 100 as it travels towards or hovers at desired coordinates. Wind, in particular, may be of constant concern. In such cases, and as noted above, method 400 can include the additional steps of detecting wind movement proximate aerial device 100 at 412. On-board stabilization features may be activated to help maintain aerial device 100 above specified position 302. If the position of aerial device 100 is found to have remained the same, the first laser beam continues to be projected onto specified position 302 etc. If the position of aerial device 100 is found to have shifted, method 400 may return to 402 to correct and reposition the aerial device 100 back over specified position 302 in response to wind forces. The processor of aerial device 100 may be configured to direct or actuate the vertical wings, along with main rotary wings 104, to correct for roll, pitch and yaw of aerial device 100, and to correct for positional shifts.

Such positional shifts may be easily recognized by the user according to the present disclosure. As soon as aerial device 100 is no longer above specified position 302, processor 204 in positioning device 202 can calculate the shift in real time and send a signal to controller 18 on aerial device 100 to indicate that aerial device 100 has shifted. Controller 18 can then direct laser 16 to either cease projecting the laser beam, or to project the second laser beam, and/or to emit the second audio sound. The user can thus visually and/or audibly recognize in real time when or if the laser point on surface 300 is at the desired specified position 302.

Method 400 may also be used in an alternate application. If the desired X, Y, Z coordinates of a particular land feature or structure are not known, aerial device 100 may be directed over surface 300 and visually positioned at or above the particular land feature. The positioning of the aerial device may be accomplished with a remote control capable of manually setting and holding the position of the drone. An operator may have a controller similar to the Mavic 2 Pro™ smart controller, shown in FIG. 6 as 606, and observe the position of the marker or laser on the surface 603. When the marker from the aerial device indicates that the aerial device is directly above the position that the operator wishes to mark (position of interest), the operator can then initiate an accurate measurement of that position by the total station. In this way, quick and direct visual confirmation of each measured point of interest can be accurately made. In practice, while the visual indicator is actively illuminating a particular position, the operator may also elect to further physically mark, indicate, or "tag" that position for subsequent confirmation that the position was tagged, and also assigning the position an index number for subsequent correlation with the total station. Since the operator is not physically holding a pole with the prism, marking of the location of interest becomes easier, less error prone, and less likely to break the synchronization 'lock' between the prism and total station. Processor 204 may then determine the distance and angle(s) between aerial device 100 and positioning device 202, and calculate the X, Y coordinates of device 100 as discussed above. While the X, Y coordinates of the particular land feature are determined, EDM device 30 may also be used to determine the Z coordinate of aerial device 100 above surface 300.

Figure 5:
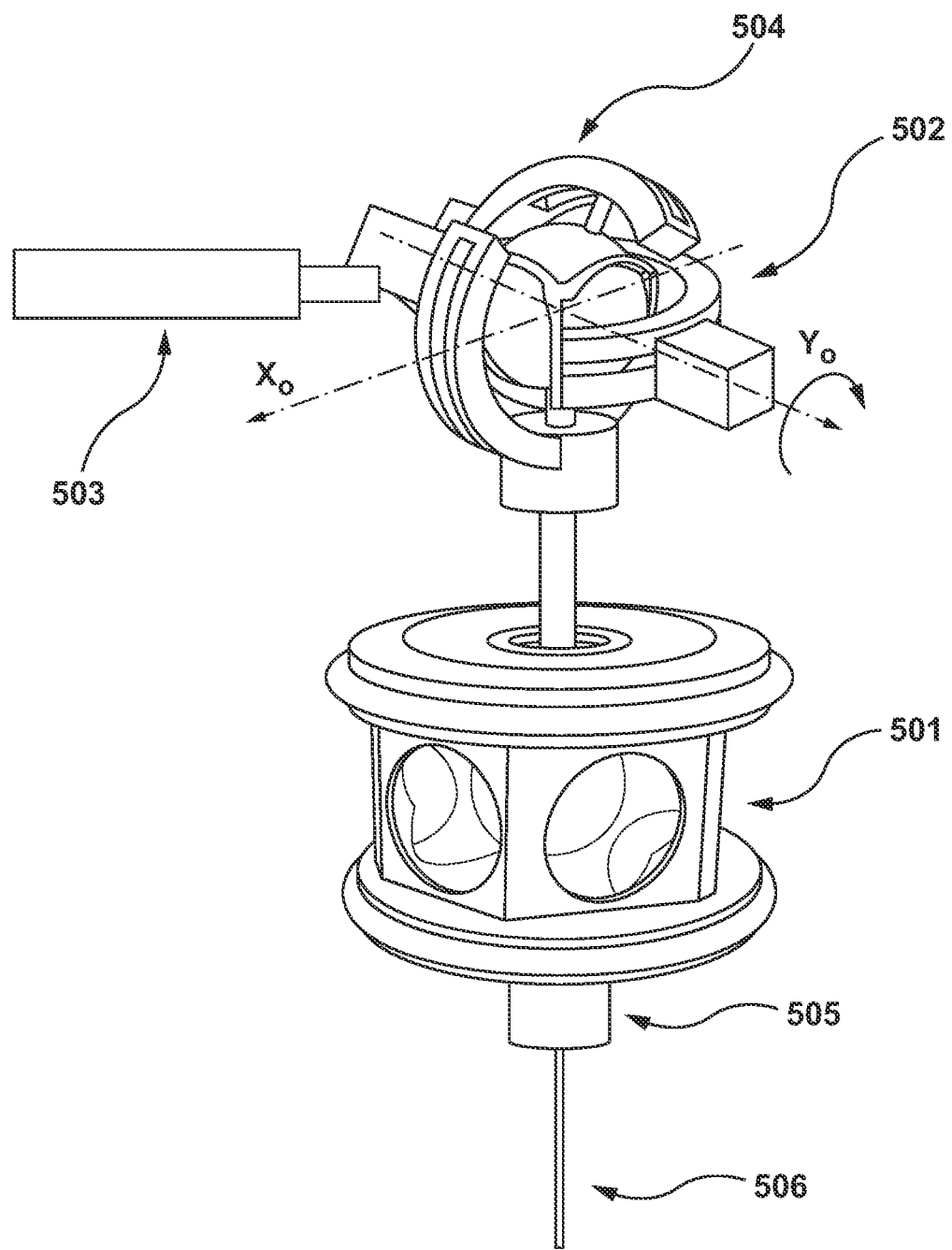
FIG. 5 is side view an embodiment of a ball joint swivel and solenoid locking mechanism coupling a prism to an aerial device in accordance with an embodiment of the invention.

Turning now to FIG. 5, the detail of one embodiment for connecting the prism to the aerial device is shown. A ball joint swivel mechanism 502 is connected to the underside of the aerial device at 504. The swivel mechanism allows the prism 501 to remain vertical, being kept vertical by gravity. This permits the aerial device to be tilted due to the requirements for stable flight while leaving the prism vertical under the aerial device. While a ball swivel is one embodiment, other embodiments such as a two orthogonal axis coupling would also be effective in keeping the vertical alignment of the prism. Connected to the prism is the spotting laser 505. The spotting laser emits a visual laser beam 506 vertically towards the ground. The vertical orientation of the entire assembly shown in FIG. 5 can be confirmed with integrated circuit inclinometers attached to the assembly (not shown) such as the SQ-SI-360DA from Signal Quest™. A corrective or calibration step can be taken, such as lowering the measurement height of the aerial device, or compensating algorithmically for the angle off vertical of the assembly. One problem that may occur as the aerial device is moved from measurement location to measurement location is that the horizontal acceleration of the aerial device may cause rocking or swaying of the measurement assembly shown in FIG. 5. To prevent this, solenoid 503 may be energized to lock the assembly when the aerial device is moving between measurement locations. When the next measurement point is reached, the solenoid can be disengaged. Since the aerial device is again stable, the rocking or swaying of the assembly will be minimized.

Figure 6:
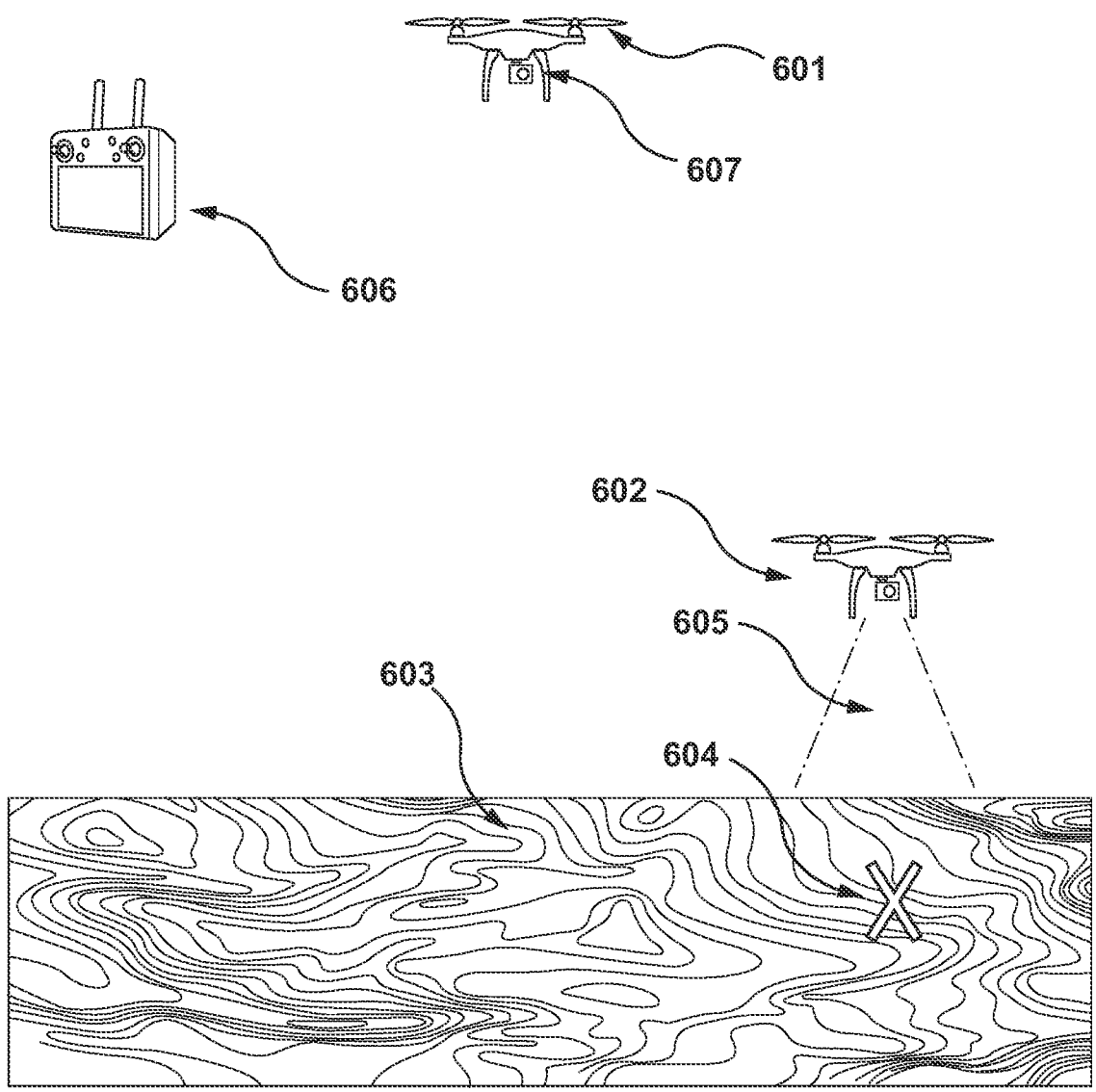
FIG. 6 is a schematic view of an aerial device in accordance with an embodiment of the invention equipped with a high resolution camera for identification of locations, survey documentation and confirmation of positioning.

With reference to FIG. 6, an aerial device is shown in multiple positions, equipped with a high-resolution camera for several functions, including identification of locations, survey documentation and confirmation of positioning. The aerial device 601 is shown at an elevation suitable for viewing a large part of the area to be surveyed 603. In typical applications several points of interest are known, and the precise location of these points is to be confirmed and documented. In many cases, there are visually resolvable features, such as the corners of walls, centres of bolt heads, or other features. The aerial device can utilize the high-resolution camera 607 to provide an area map of the entire area or a subsection of the area. The image can then be analyzed for features and compared to a reference map of where these same features are intended to be located. The area map can be reference by observing the image from the aerial device and manually looking for those features, or the image could be interpreted by an algorithm that identifies these features.

The map, or the map interpreted by the algorithm, can be displayed on the aerial device controller, 606, and the aerial device 602 can then be instructed, either by manual controls on the aerial device controller, or by automated instructions based on the algorithm that identified the features, to locate above these features or points of interest 604. Further points of interest can be added by establishing a reference point in the area and specifying points that are some displacement from that reference point.

To measure a specific point of interest, the aerial device may be positioned over one of the points. In one embodiment, a GPS system is used to direct the aerial device close to the point of interest, and a visible laser beam is directed towards the location, typically at a lower elevation than the elevation required to take an image of the entire area. The elevation can be confirmed through a ranging technique using a range module. The range module can use information from the total station to estimate vertical position, or can alternatively use either infrared or sonar (ultrasound), where ultrasound is the most accurate.

A high-resolution image of the 'zoomed in' image including the laser 'dot' is taken. An additional high precision measurement is then taken using an infrared signal from a total station in combination with the prism connected to the aerial device. In this way, a precise location of the aerial device, along with a photographic record of the measurement is taken and can be recorded. Even if the aerial device is not perfectly on top of the point of interest, the offset from the feature of interest can be calculated as the image has both the laser dot marking the precision measured location and the image that contains the features to be measured. In a slightly different use, the operator may have controls to 'micro adjust' the position of the aerial device such that the location dot becomes aligned with the feature of interest. Once the alignment is satisfactory, the operator may trigger a precision measurement from the total station, including visual record confirmation of the measurement through a captured high-resolution image 605.

In other embodiments, the operator may be required to physically mark locations that do not have any associated features. In particular, the features to be marked may be features that are planned to be constructed, but have not yet been built. These features often are in a building plan database. Elements of the database can be calculated and visually placed on a map that the operator sees overlaid with the recent image from the aerial device. Various well known techniques from the field of augmented reality can control the opacity and angle of view of various features. Controls can be provided to the operator to select varying details from the plan so that the operator can visualize where the proposed features will be built, and mark important points on location.

In this case, the aerial device can be moved close to the required location, by GPS, manually, or visual means. A more accurate movement towards the required location can be attained by using DGPS or Differential GPS technology. Continuous, high precision measurements made via the total station and the prism on the aerial device can be relayed to the operator via aerial device controller 606 to fine tune the position of the aerial device over the required location. Once the aerial vehicle is over the required location, a visual marker, such as a laser, a laser target, crosshairs or similar can be projected from the laser on the aerial vehicle to mark the spot.

Extending this technique, it is possible to pre-program a series of desired measurement points into a database, and have the aerial vehicle move between points automatically. Of particular interest would be the case where fully automated measurements are taken, and the high resolution photographic data is processed to confirm that points of interest match visually recognizable features in the area. Of importance with systems that automatically move between measurement points, is implementing an effective collision avoidance system, as is known and practiced in many commercial UAV's (Unmanned Aerial Vehicle) or aerial devices.

While the described example shows measurement of features from a vertical height downward to an area, this technique can also easily be extended to mark and verify measurements along vertical or sloped surfaces. Of particular utility in some construction environments may be projecting a high precision vertical light beam on a vertical surface for confirmation or marking.

Figure 7:
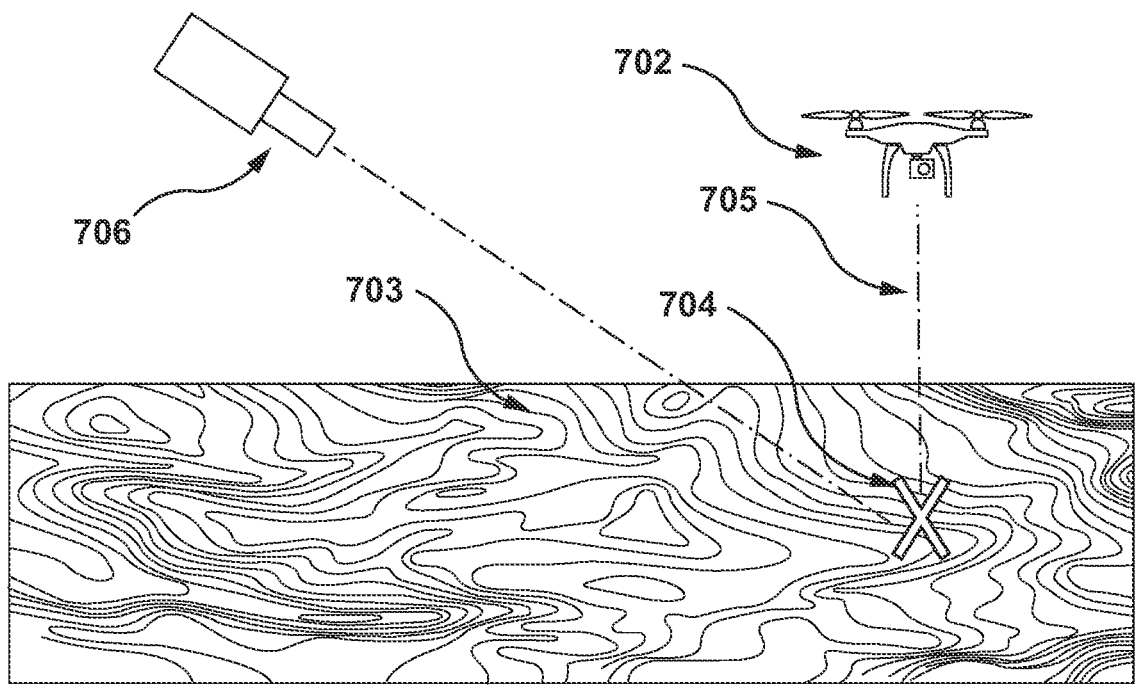
FIG. 7 is a view similar to FIG. 6 where a desired location is indicated by use of a laser or light target on the measurement site.

Turning now to FIG. 7, in other embodiments, the positioning of the aerial vehicle in the area to be surveyed can be accomplished by use of a tracking signal. Handheld laser signal 706 may be directed towards a feature 704 in the area 703 that is to be accurately measured. The aerial vehicle can detect the unique illumination of the laser signal in the field, via the high-resolution camera. In this embodiment, the preferred modality of the camera would be a continuous video camera. The aerial device can then automatically calculate the difference between its current location and the desired illuminated point of interest, and travel to above that spot. The ability of the aerial device to accurately determine the illuminated spot can be enhanced through several means including color image filters on the camera or with image post processing, or by creating a modulation pattern within the illumination so that the on-off pulses of the illumination pattern will be unique and different from the rest of the illumination in the area. Once the high resolution camera in aerial device 702 has determined that it is in the correct position (the illuminated spot is directly underneath) the aerial device can initiate a precision measurement with the total station and also record an image of the illumination marker and any features in the nearby area.

Features from these embodiments and inventive aspects can be used individually, or in combination to enable enhanced workflows and efficient high precision measurements. For example, the audible indications from the aerial device when a stable measurement position is attained can be effectively used with the location pointing system illustrated in FIG. 7.

In particular, many of the embodiments described herein are highly advantageous in locations where accessibility is difficult or dangerous. The traditional method of using a vertical pole with a prism to verify the location of features in an area can be difficult, dangerous, and subject personnel to significant risk. Such locations include locations with steep gradients, unstable surfaces, toxic substances, large distances, locations at significant vertical heights, or locations with high numbers of measurements to be completed quickly.

The present disclosure may be used in a variety of applications, including topographic surveys, particularly when the locations to be surveyed are difficult to get to, such as rough mountains, swamp lands, hazardous waste sites, sewage ponds, volcanos, etc. The present disclosure may also be deployed to look for property corners, survey traffic accidents, and acquire measurements on tall buildings etc. A short list of possible use applications that could advantageously use the features of this invention includes:

TOPOGRAPHICAL
BOUNDARY
VERTICAL CONSTRUCTION: SKYSCRAPERS, APARTMENTS, HOSPITALS.
HORIZONTAL CONSTRUCTION: ROADS, BRIDGES, RAILWAYS
HEAVY CIVIL CONSTRUCTION: DAMS, HYDRO GENERATING
GEOLOGICAL
HAZARDOUS LOCATIONS
DIFFICULT TO REACH LOCATIONS
MONUMENT MEASUREMENT
WET-SETTING ANCHOR BOLTS
MAPPING
MINING
MONITORING
STOCKPILE VOLUME
FORESTRY
EXCAVATION MONITORING
ROOF MEASUREMENTS
AS-BUILT SURVEYS
CRANE RAILS
PIPE LINES
ICE FLOW MONITORING
REAL ESTATE
SEARCH AND RESCUE
GRADING
INSPECTIONS
STEEL PLANTS
ROAD INTERSECTION SURVEYS

It is to be understood that what has been described are the preferred embodiments of the invention. The scope of the claims should not be limited by the preferred embodiments set forth above, but should be given the broadest interpretation consistent with the description as a whole.

The invention claimed is:

1. An apparatus for use with a rotorcraft or flying machine and a positioning device, the apparatus for locating and marking a position on a surface, the apparatus comprising:
   a gimbal or swivel securable to the rotorcraft or flying machine;
   a prism fixed to the gimbal or swivel for reflecting signals from the positioning device, the prism having a center of mass;
   a laser secured to the gimbal or swivel and directed away from the center of mass of the prism towards the surface; and
   a controller for communication with the positioning device, the controller operatively coupled to the laser to operate the laser.

2. The apparatus of claim 1, wherein the prism is a 360 degree prism.

3. The apparatus of claim 1, further comprising an electronic distance measurement device (EDM), the laser forming part of the EDM.

4. The apparatus of claim 1, wherein the laser is adapted to project laser beams in multiple colours and/or having one or more designs or images.

5. The apparatus of claim 1, further comprising an audio device for projecting one or more audio signals, the audio device being operatively coupled to the controller.

6. An aerial device for use with a positioning device for locating and marking a position on a surface, the aerial device comprising:
   a rotorcraft with primary rotary wings and a processor to control the primary rotary wings; and
   the apparatus of claim 1 secured to the rotorcraft.

7. The aerial device of claim 6, further comprising a wind sensor operatively coupled to the processor, the wind sensor adapted to detect movement of wind proximate the aerial device.

8. The aerial device of claim 6, wherein the rotorcraft further comprises vertical wings mounted generally perpendicular to the rotary wings, the vertical wings controlled by the processor.

9. A system for locating and marking a position on a surface, the system comprising:
- the aerial device of claim 6; and
- a stationary positioning device adapted to send and receive signals from the aerial device, the positioning device comprising a processor configured to calculate the coordinates of the aerial device from the received signals.

10. The system of claim 9, wherein the stationary positioning device is a total station.

11. A method for locating and marking a specified position on a surface using a stationary positioning device and an aerial device, the aerial device having a rotorcraft, a gimbal secured to the rotorcraft, a prism fixed to the gimbal, a laser secured to the gimbal, and a controller operatively coupled to the laser, the method comprising:
- directing the aerial device to be located above the surface;
- determining a distance and an angle between the aerial device and the positioning device;
- positioning the aerial device over the specified position based on the distance; and
- projecting a first laser beam onto the specified position on the surface when the aerial device is positioned over the specified position.

12. The method of claim 11, wherein the aerial device is positioned at X, Y, Z coordinates, and the specified position on the surface is at X, Y.

13. The method of claim 12, further comprising detecting wind movement proximate the aerial device and repositioning or maintaining the aerial device over the specified position in response to the wind movement.

14. The method of claim 12, further comprising projecting a second laser beam onto the surface when the aerial device is not positioned over the specified position.

15. The method of claim 14, wherein the first laser beam has a first colour and/or first image, and the second laser beam has a second colour and/or second image.

16. The method of claim 11, further comprising emitting a first audio signal when the aerial device is positioned over the specified position.

17. The method of claim 16, further comprising emitting a second audio signal when the aerial device is not positioned over the specified position.

18. An apparatus for creating an accurately located image of a location, the apparatus comprising:
- an aerial device capable of locating above the desired location;
- an illumination system capable of indicating where the aerial device is located;
- controls for adjusting the position of the aerial device to more precisely position where the illumination system aligns with a feature of the environment; and
- a system for performing a precision measurement of the location of the aerial device when aligned with the feature of the environment.

19. The apparatus of claim 18 whereby a photographic record is taken of the feature and the illumination.

20. A method of measuring the position of a feature in an environment, the method comprising:
- an illumination system capable of illuminating a physical feature in the environment;
- an aerial device capable of sensing the illumination, the aerial device also capable of locating above the desired location; and
- a system for performing a precision measurement of the location of the aerial device when aligned with the feature of the environment.

* * * * *